Figure 10:
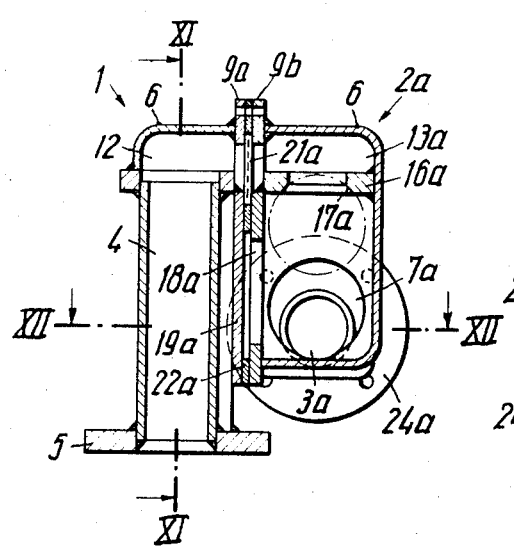

United States Patent [19]
Lenz

[11] 3,858,603
[45] Jan. 7, 1975

[54] AIR VENT HEAD

[76] Inventor: Josef Lenz, 2831 Russen, Haus, Germany

[22] Filed: Feb. 8, 1973

[21] Appl. No.: 330,663

[52] U.S. Cl................... 137/433, 114/212, 137/41, 137/423, 137/612.1, 220/44 B
[51] Int. Cl........................ F16k 31/22, B63j 2/02
[58] Field of Search............ 137/41, 202, 269, 271, 137/423, 433, 608, 612.1; 220/44 R, 44 A, 44 B; 114/212

[56] References Cited
UNITED STATES PATENTS

| 584,278 | 6/1897 | Viney.................................. 137/608 |
| 601,472 | 3/1898 | Knickerbacker................... 137/608 |
| 1,435,331 | 11/1922 | Pasco................................ 220/44 R |
| 1,851,084 | 3/1932 | Brown et al............... 220/44 B UX |
| 3,620,240 | 11/1971 | Bogdanski.......................... 137/202 |
| 3,722,544 | 4/1971 | Westenberg...................... 137/608 |

FOREIGN PATENTS OR APPLICATIONS

| 1,346 | 11/1896 | Great Britain..................... 114/212 |
| 69,130 | 6/1893 | Germany............................ 114/212 |
| 143,674 | 5/1961 | U.S.S.R.............................. 137/41 |
| 361,649 | 10/1922 | Germany............................ 137/608 |
| 6,906,555 | 11/1970 | Netherlands....................... 137/433 |

Primary Examiner—William R. Cline
Assistant Examiner—Gerald A. Michalsky
Attorney, Agent, or Firm—Charles Hieken; Jerry Cohen

[57] ABSTRACT

This invention relates to air vent heads, especially for ventilation of ship's tanks. The new air vent head consists of an assembly of a central joint unit connectable and accommodated in size to a ventilating duct and one or more peripheral units with orificial chambers. The size of the peripheral units is uniform and the accommodation to the width or square area of the respective ventilating duct and joint chamber is ensured by connection of a corresponding number of peripheral units to the central joint unit.

8 Claims, 12 Drawing Figures

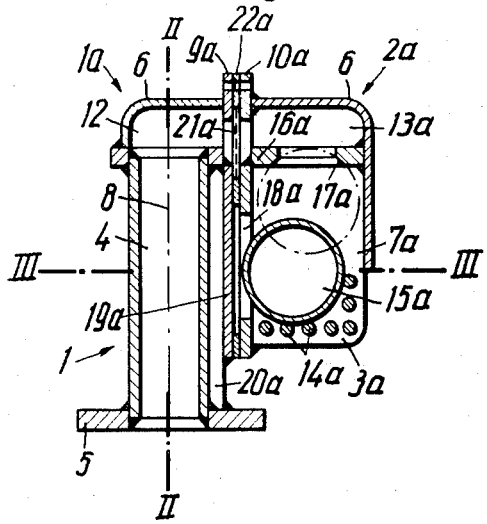
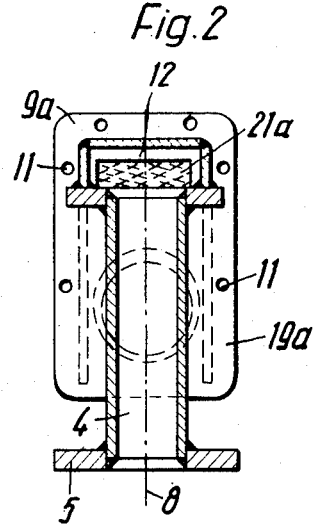
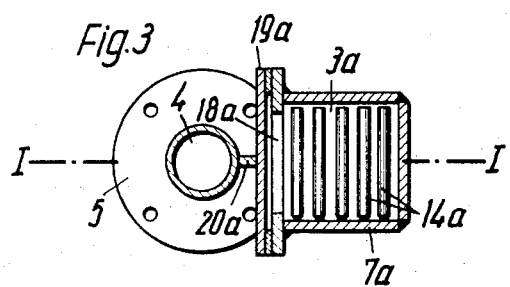
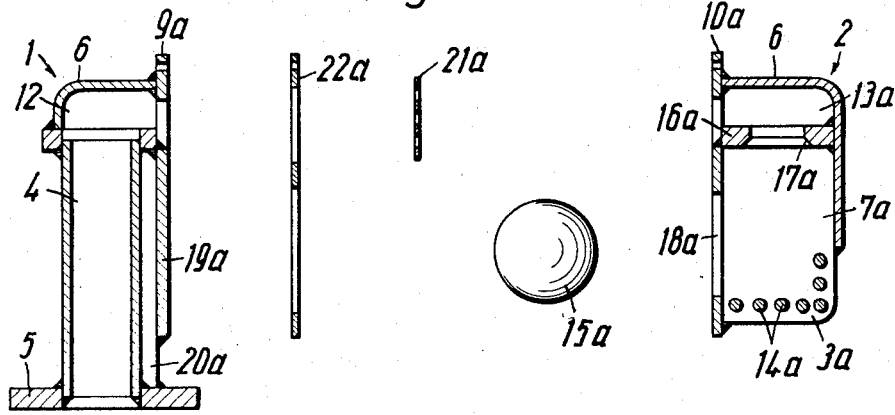

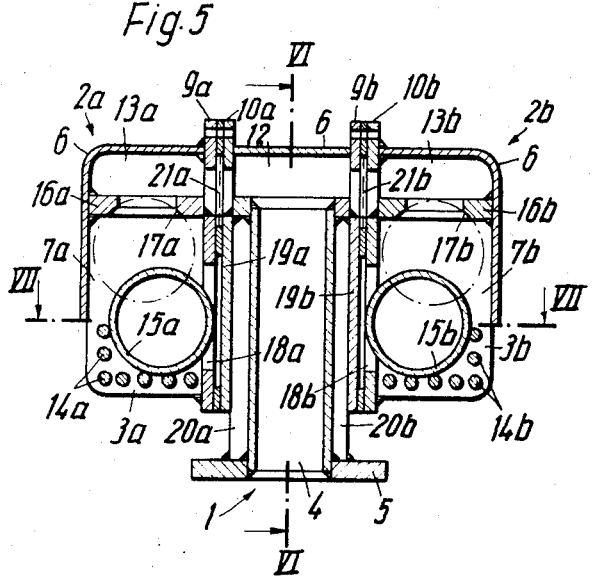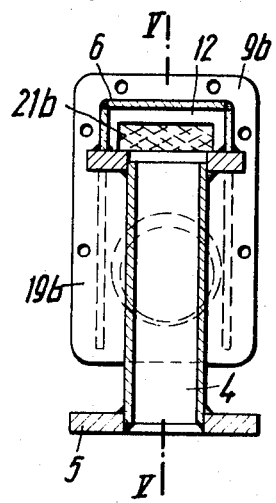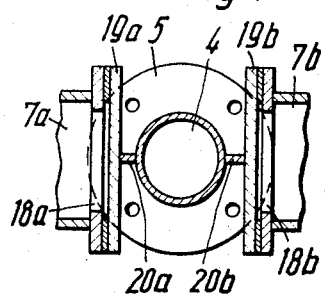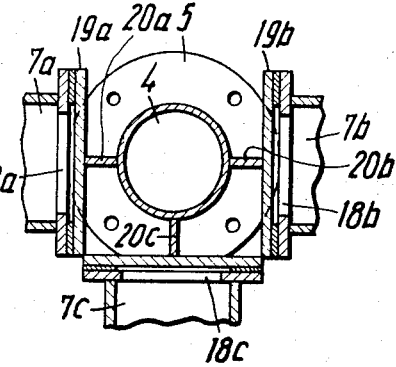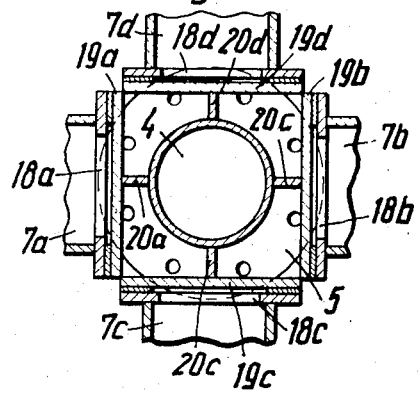

AIR VENT HEAD

The invention relates to air vent heads, especially for ventilation of ship's tanks, including a joint chamber connectable to a ventilating duct, an overhead chamber and one or more orificial chambers connected to the underside of said overhead chamber and containing a float ball valve to prevent the entrance of water from outside.

In the known air vent heads of this type said joint chamber, overhead chamber and orificial chambers are made as a single unit. Therefore, complete vent heads of different size must be available for different throughputs of the unit, which is disadvantageous for manufacture, storage and supply of spare parts. Furthermore, the manufacture of the vent head as a one piece unit constructionally and functionally is unfavourable because special constructions must be provided to enable an exchange of said float balls and also a normally provided back fire grids.

It is an object of the invention to provide an air vent head of the above described type which in connection with a simple manufacture and a good accommodation to different rates of flow or throughput will afford an economical storage and a simple exchangebility of float balls and back fire grids.

In the solution of this problem, the invention proceeds from the consideration that the size of the joint chamber in any case must be accommodated to the respective throughput or rate of quantity of flow and to the width of the respective ventilating duct whereas a large surplus of space in any case is available within the outer area of the overhead chamber to ensure the required total sectional area.

Proceeding from this consideration, a satisfying solution of the present problem has been achieved by that the air vent head consists of an assembly of two or more unit parts namely a central joint unit including said joint chamber and one or more peripheral units including said orificial chambers. Owing to such a division the aperture for passage of said float ball now may be arranged within an area, through which a passage was not possible in connection with a conventional one piece construction of the vent head. Thus, for the passage of the float balls said orificial chambers may be provided with an aperture within their side walls facing said central joint unit. In such a construction the apertures for the passage of the float balls are made accessible by removing of the respective peripheral unit from the central joint unit and are closed just by connection of said units. Covering of said apertures may be performed by the wall of said joint chamber or by fixed cover plates which may consist of extension prolongations of respective flanges of the joint unit. The size of the peripheral units may be uniform because the accommodation to the width or square area of the respective ventilating duct and joint chamber may be ensured by connection of more than one peripheral unit to the central joint unit.

Figure 11:
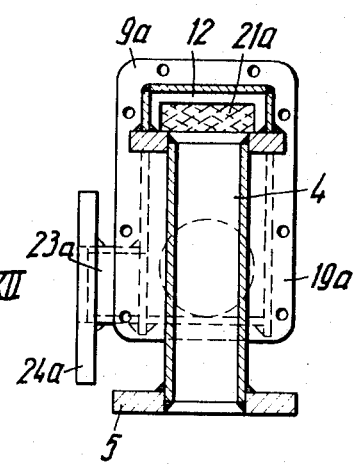
Figure 12:
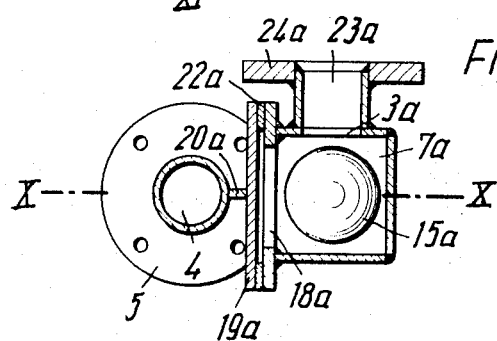

In order to make the invention clearly understood, reference will now be made to the accompanying drawings which are given by way of example and in which FIG. 1 is a vertical sectional view through an air vent head according to the invention including a single orificial chamber, taken along the line I—I of FIG. 3, FIG. 2 is a vertical sectional view taken along line II—II of FIG. 1, FIG. 3 is a horizontal sectional view taken along line III—III of FIG. 1, FIG. 4 is the vent head of FIG. 1 in exploded position of its parts, FIG. 5 is a vertical sectional view of an air vent head including two orificial chambers, taken along line V—V of FIG. 6, FIG. 6 is a vertical sectional view taken along line VI—VI of FIG. 5, FIG. 7, 8 and 9 are horizontal sectional views like FIG. 3 of air vent heads including two, three and four orificial chambers, FIG. 10 is an air vent head with connection of its orificial chamber to the ship's side, taken along the line X—X of FIG. 12, FIG. 11 is a vertical sectional view taken along the line XI—XI of FIG. 10, and FIG. 12 is a horizontal sectional view taken along the line XII—XII of FIG. 10.

The air vent heads shown in the drawing essentially consist of a central joint unit 1 which is connectable to a ventilating duct, especially the ventilating shaft of a ship's tank (not shown in the drawing) and one or more peripheral units 2a,b, with air orifices 3a,b.

The central joint unit 1 consists of a tube-like joint chamber 4 with flange 5 for connection to the ventilating shaft. The upper end of joint chamber 4 is connected to an overhead chamber 6 extending like a cap across joint chamber 4 and orifice chambers 7a,b, within said peripheral units.

Joint unit 1 and peripheral units 2 are connected by flanges 9a,b, and 10a,b, lying in planes parallel to the axis 8 of joint chamber 4 and by screws 11. Said flanges 9, 10 divide the overhead chamber 6 in a central deflection chamber 12 converting the vertical upwards air stream through the ventilating shaft and joint chamber 4 into one or more horizontal radial air streams, and in one or more peripheral deflection chambers 13a,b, lying above said orifice chambers 7 and converting the horizontal air streams from the central deflection chamber 12 into separate vertical air streams directed downwardly into the orifice chambers.

The orifices 3 of chambers 7 are closed by grids 14a,b, to hold the float balls 15a,b, within the orifice chambers which shut the connection from these chambers to the overhead chamber 6 when water would enter the air vent head from outside through the orifices 3. For this purpose the deflection chambers 13 and orifice chambers 7 are separated by dividing walls 16a,b with float ball seats 17a,b.

The orifice chambers 7 each are provided with an aperture 18a,b,c,d used as passages for the float balls 15 when the respective peripheral unit 2 is removed from the central joint unit 1. Cover plates 19a,b,c,d are provided for the ball passage apertures which plates consist of extension prolongations of the respective flanges 9. These plates each are connected by a rib 10a,b,c,d to the tube like joint chamber 4.

Back fire grids 21a,b, are arranged between the central deflection chamber 12 and the peripheral deflection chambers 13 of overhead chamber 6. These grids 21 are held between flanges 9 and 10, so that they are protected against mechanical damage and notwithstanding can easily be exchanged. They are embedded into a gasket 22a,b, between flanges 9 and 10.

The size of the central joint unit 1 is accommodated to the width of the respective ventilating duct whereas the peripheral unit may have the same size and form for all types of air vent heads because the accommodation within the peripheral units can be realized by connecting a corresponding number of peripheral units to a central joint unit.

FIGS. 10–12 show an embodiment in which the orifice 3 of the peripheral unit 2 is arranged sidewise and is provided with a connecting piece 23a . . . with flange 24a . . . for an air pipe to an orifice within the ship's side (not shown in the drawing). Such an embodiment is used if the air vent head is situated within a closed ship's room in order to prevent air and oil or oil gases from entering the ship's room. An oil catching pot may be arranged to avoid pollution of environment.

Many modifications and other embodiments are possible within the scope of the invention. Especially the division into several units could be placed at an other spot of the separated air streams as for instance at the dividing walls 16.

Also peripheral units of different size accommodated to the size of the respective central unit could be used, if desirable.

I claim:

1. In an air vent head, especially for ventilation of ship's tanks, including a joint chamber having a center line connectable to a ventilating duct, an overhead chamber and at least one orificial chamber connected to the underside of said overhead chamber and containing a check valve with a float ball to prevent the entrance of water from outside, the improvement comprising, means defining at least one plane parallel to the center line of said joint chamber for dividing the air vent head into at least one peripheral unit and a central joint unit including said joint chamber and a central deflection chamber comprising that part of said overhead chamber facing said joint chamber, said at least one peripheral unit including said orificial chamber and a peripheral deflection chamber comprising that part of said overhead chamber facing said orificial chamber, said orificial chamber for the passage of said float ball including means forming a ball passage aperture within the chamber side wall facing said central joint unit.

2. The improvement of claim 1 wherein the size of said central unit relative to the number of said peripheral units is arranged for accommodation with the width of the respective ventilating duct.

3. The improvement of claim 1 and further comprising a cover plate for covering said ball passage aperture.

4. The improvement of claim 3 wherein said joint unit includes at least one flange and said cover plate consists of an extension prolongation of a respective flange of said joint unit.

5. The improvement of claim 4 and further comprising a rib connecting said cover plate to the said central joint chamber.

6. The improvement of claim 1 and further comprising means defining at least one passage between said central and peripheral deflection chambers, and back fire grids within the passages between said central and peripheral deflection chambers.

7. The improvement of claim 1 and further comprising at least one dividing wall formed with a float ball seat between said orificial chamber and peripheral deflection chamber.

8. The improvement of claim 1 wherein the orificial chamber of said peripheral unit includes a connecting piece for an air pipe.

* * * * *